(12) United States Patent
Dobbs

(10) Patent No.: US 9,048,765 B2
(45) Date of Patent: Jun. 2, 2015

(54) ENGINE POWERED GENERATOR

(75) Inventor: Justin Dobbs, Ithaca, NY (US)

(73) Assignee: Innovus Power, Inc., Freemont, CA (US)

( * ) Notice: Subject to any disclaimer, the term of this patent is extended or adjusted under 35 U.S.C. 154(b) by 0 days.

(21) Appl. No.: 14/008,379

(22) PCT Filed: Mar. 28, 2012

(86) PCT No.: PCT/US2012/030807
§ 371 (c)(1),
(2), (4) Date: Sep. 27, 2013

(87) PCT Pub. No.: WO2012/135258
PCT Pub. Date: Oct. 4, 2012

(65) Prior Publication Data
US 2014/0015257 A1    Jan. 16, 2014

Related U.S. Application Data

(60) Provisional application No. 61/469,035, filed on Mar. 29, 2011.

(51) Int. Cl.
*F02D 29/00* (2006.01)
*H02P 9/04* (2006.01)
*F02B 63/04* (2006.01)
*F02D 29/06* (2006.01)
(Continued)

(52) U.S. Cl.
CPC ............... *H02P 9/04* (2013.01); *F02B 63/042* (2013.01); *F02D 29/06* (2013.01); *F02D 41/0007* (2013.01); *F02D 41/083* (2013.01); *F02D 41/107* (2013.01); *F02D 2041/141* (2013.01); *Y02T 10/144* (2013.01); *H02P 9/008* (2013.01)

(58) Field of Classification Search
USPC .................................................. 290/3; 60/608
See application file for complete search history.

(56) References Cited

U.S. PATENT DOCUMENTS 4,010,717 A    3/1977  Taplin
4,634,887 A *  1/1987  Balch et al. ...................... 290/3
(Continued)

FOREIGN PATENT DOCUMENTS

EP           564268 A1 * 10/1993 .............. F02B 39/10
WO    WO-03/018974 A1    3/2003

OTHER PUBLICATIONS

International Search Report and Written Opinion; PCT/US2012/030807; 9 pages; dated Oct. 19, 2012.
(Continued)

*Primary Examiner* — Joseph Waks
(74) *Attorney, Agent, or Firm* — Foley & Lardner LLP

(57) ABSTRACT

An electric power generation system including an engine, an electrical generator, and a system controller. The engine is configured to produce mechanical power and includes an engine controller and a turbocharger for raising air pressure to a boost pressure. The turbocharger is controlled by the engine controller during steady state operation of the system. The electrical generator is mechanically connected to the engine and converts mechanical power into electrical power. The system controller is configured to receive a signal indicative of an electrical load on the generator. During a transient condition during which the electrical load increases, the system controller is configured to directly control the turbocharger in order to change the configuration of the turbocharger in order to increase boost pressure.

9 Claims, 5 Drawing Sheets

(51) Int. Cl.
   *F02D 41/00* (2006.01)
   *H02P 9/00* (2006.01)
   *F02D 41/08* (2006.01)
   *F02D 41/10* (2006.01)
   *F02D 41/14* (2006.01)

(56) References Cited

U.S. PATENT DOCUMENTS

| | | | | |
|---|---|---|---|---|
| 4,850,193 | A * | 7/1989 | Kawamura | 60/608 |
| 4,896,090 | A * | 1/1990 | Balch et al. | 318/52 |
| 5,079,913 | A * | 1/1992 | Kishishita | 60/597 |
| 5,406,797 | A * | 4/1995 | Kawamura | 60/608 |
| 6,408,625 | B1 | 6/2002 | Woon et al. | 60/608 |
| 6,415,606 | B1 * | 7/2002 | Bowman et al. | 60/608 |
| 7,076,954 | B1 * | 7/2006 | Sopko et al. | 60/607 |
| 7,137,253 | B2 * | 11/2006 | Furman et al. | 60/608 |
| 7,174,714 | B2 * | 2/2007 | Algrain | 60/608 |
| 7,992,389 | B2 * | 8/2011 | Furman et al. | 60/608 |
| 8,205,450 | B2 * | 6/2012 | Barthelet | 60/608 |
| 8,584,459 | B2 * | 11/2013 | Richards | 60/608 |
| 2006/0113799 | A1 * | 6/2006 | Obayashi et al. | 290/40 B |
| 2006/0123784 | A1 * | 6/2006 | Algrain | 60/608 |
| 2007/0157910 | A1 | 7/2007 | Obayashi et al. | |
| 2009/0076708 | A1 * | 3/2009 | Shiraishi et al. | 701/103 |
| 2009/0211253 | A1 | 8/2009 | Radcliff et al. | |
| 2009/0261599 | A1 | 10/2009 | Alston et al. | |

OTHER PUBLICATIONS

Samuel Beaudoin et al., "White Paper on: Variable Speed Gensets, Reduce Fuel Consumption & Optimize Engine Performance", CVT Corp., Sainte-Julie, Qc. Canada; 12 pages.

* cited by examiner

ENGINE POWERED GENERATOR

CROSS REFERENCE TO RELATED APPLICATIONS

This application claims priority to and the benefit of U.S. Provisional Patent Application No. 61/469,035, filed Mar. 29, 2011. The foregoing provisional application is incorporated by reference herein in its entirety.

BACKGROUND

The present disclosure relates generally to the field of engine generators. More particularly, the present disclosure relates to variable speed engine generator. According to one exemplary embodiment a system including a diesel generator set is disclosed.

Engine generators generally include a prime mover (e.g., engine), electrical generator 40, and various controllers and circuitry. Collectively, the components of an engine generator are often referred to as a generator set, gen-set, or genset. The prime mover is configured to create mechanical energy and is mechanically linked to the electrical generator to transfer the mechanical energy to the electrical generator. The electrical generator is configured to convert the mechanical energy from the prime mover into electrical energy, such as alternating current (AC) electrical power. Other controllers may, for example, include a system controller (i.e., for the engine generator or plurality of engine generators used together) and an engine controller (i.e., to control the prime mover).

As shown in FIG. 1, conventional engine generators are configured for the engine to operate at fixed speeds, often according to the frequency of AC current used in particular regions. For example, an engine-generator set 100 may produce AC current at 50 Hz for use in the United Kingdom with the engine set to operate at 1500 or 3000 RPM. The engine speed is set by an input 240 to the engine controller or governor 220. An engine-generator for use in the United States may produce AC current at 60 Hz and have an engine set to operate at 1800 or 3600 RPM. The fixed speeds of the prime mover (engine) 200 ensure generally constant frequency output.

Variable speed engine generators are configured for the prime mover to operate through a range of speeds. The generator set 300 includes an output converter to adjust the output voltage. The output may be rectified using conditioning circuitry to convert AC power into DC power having generally constant voltage. The DC power output from the rectifier may then be used to power DC-powered electronic devices or be converted by other circuitry into AC power.

One difficulty associated with engine generators, whether fixed or variable speed, is their ability to respond to transient (i.e., changing) load conditions, such as when an electrical load is started or where there is prompt increase in power requirement. The additional load placed on the generator 300 causes a corresponding drop in the voltage produced by the electrical generator. The voltage regulator 350, for example in a wound-field generator, receives inputs related to the sensed voltage 370 and the desired voltage setting 380 and attempts to regulate voltage by increasing the excitation (i.e., field current 360) of the electrical generator. The increased excitation causes a corresponding increase in the counter torque applied to the engine 200, thereby increasing load on the engine 200 and reducing engine speed. In response to an input related to the change of speed 210, the engine controller 220 and/or the system controller may call for increased output from the engine to match the electrical load drawn from the electrical generator, such as by adjusting fuel delivery 230 to the engine to restore or maintain engine speed. However, because engine speed is a lagging indicator of electrical load, the electrical output 340 of the generator 300 may fluctuate causing inconsistent and inefficient power delivery to attached devices.

Another difficulty associated with responding to transient conditions is the possibility of engine stalling. In order to meet stringent emission control standards, engines are controlled so that fuel delivery is restricted in certain situations. For example, the engine and/or system controller may call for more fuel to create additional torque, but the emissions control program of the engine controller may prevent delivery of fuel to the engine so as to prevent creation of harmful pollutants, such as particulate matter and $NO_x$. More particularly, for engines utilizing turbochargers, the engine controller may limit fuel injection until boost pressure is built up in the intake manifold. Meanwhile, while increased fuel delivery is delayed, counter torque from the electrical generator continues to increase and may ultimately overcome engine torque and cause the engine to stall. Controls may also limit fuel delivery to prevent engine damage or fuel waste, and fuel delivery may be limited by physical parameters of the engine design itself.

Accordingly, it would be advantageous to provide an engine generator and control system that more quickly respond to increased electrical load conditions for consistent power delivery and to prevent engine stalling.

SUMMARY

According to an embodiment of the invention, an electric power generation system is provided. The system includes an engine, an electrical generator, and a system controller. The engine is configured to produce mechanical power and includes an engine controller and a turbocharger for raising air pressure to a boost pressure. The turbocharger is controlled by the engine controller during steady state operation of the system. The electrical generator is mechanically connected to the engine and converts mechanical power into electrical power. The system controller is configured to receive a signal indicative of an electrical load on the generator. During a transient condition during which the electrical load increases, the system controller is configured to directly control the turbocharger in order to change the configuration of the turbocharger in order to increase boost pressure.

The system may further include a sensor for detecting a current being drawn by the electrical load. The sensor is located downstream of circuitry for conditioning the generated electrical power. Also, the system may be configured so that the signal received by the controller is indicative of an anticipated electrical load to be supplied by the generator.

According to an alternative embodiment, an electric power generation system including an engine, an electrical generator, and a system controller is provided. The engine is configured to produce mechanical power and the electrical generator is mechanically connected to the engine and converts mechanical power into electrical power. The system includes conditioning circuitry for conditioning the generated electrical power. The system controller is configured to determine an expected electrical load on the generator based on a current electrical load and an anticipated electrical load. The system controller receives a signal indicative of a instantaneous torque capability of the engine and is configured to determine a required engine torque needed to generate sufficient electrical power to supply the expected load value. If the required engine torque is greater than the instantaneous torque capability, the system controller is configured to control the conditioning circuitry to limit the power generated by the generator. The conditioning circuitry may include an active rectifier.

According to another embodiment, an electric power generation system including an engine, an electrical generator, and a system controller is provided. The engine is configured to produce mechanical power and includes an engine controller for controlling fuel to the engine. The electrical generator is mechanically connected to the engine and converts mechanical power into electrical power. The system controller is configured to receive a signal indicative of an electrical load on the generator. According to a transient control strategy, the system controller is configured to determine an expected electrical load and based on the expected load and existing engine conditions. The system controller provides a signal to the engine controller to deliver fuel to the engine sufficient to produce the required torque and power for the expected load. According to a steady state control strategy, the system controller directs the engine controller to control the fuel to the engine to maintain a requested steady state speed. If the fuel requirement determined by the steady state control strategy is greater than the fuel requirement determined by the transient control strategy, the engine controller is configured to control the fuel to the engine based on the signal provided by the system controller according to the steady state control strategy.

The system may be configured so that if the fuel requirement determined by the steady state control strategy is less than the fuel requirement determined by the transient control strategy, the engine controller is configured to control the fuel to the engine based on the signal provided by system controller according to the transient control strategy. In addition, the system controller may be configured to determine the expected load based on a signal provided to the system controller by the electrical load, wherein the signal is indicative of an anticipated change in the power to be demanded by the electrical load.

It is to be understood that both the foregoing general description and the following detailed description are exemplary and explanatory only and are not restrictive of the invention as claimed.

BRIEF DESCRIPTION OF THE DRAWINGS

These and other features, aspects, and advantages will become apparent from the following description, appended claims, and the accompanying exemplary embodiments shown in the drawings, which are briefly described below.

DETAILED DESCRIPTION

Figure 1:
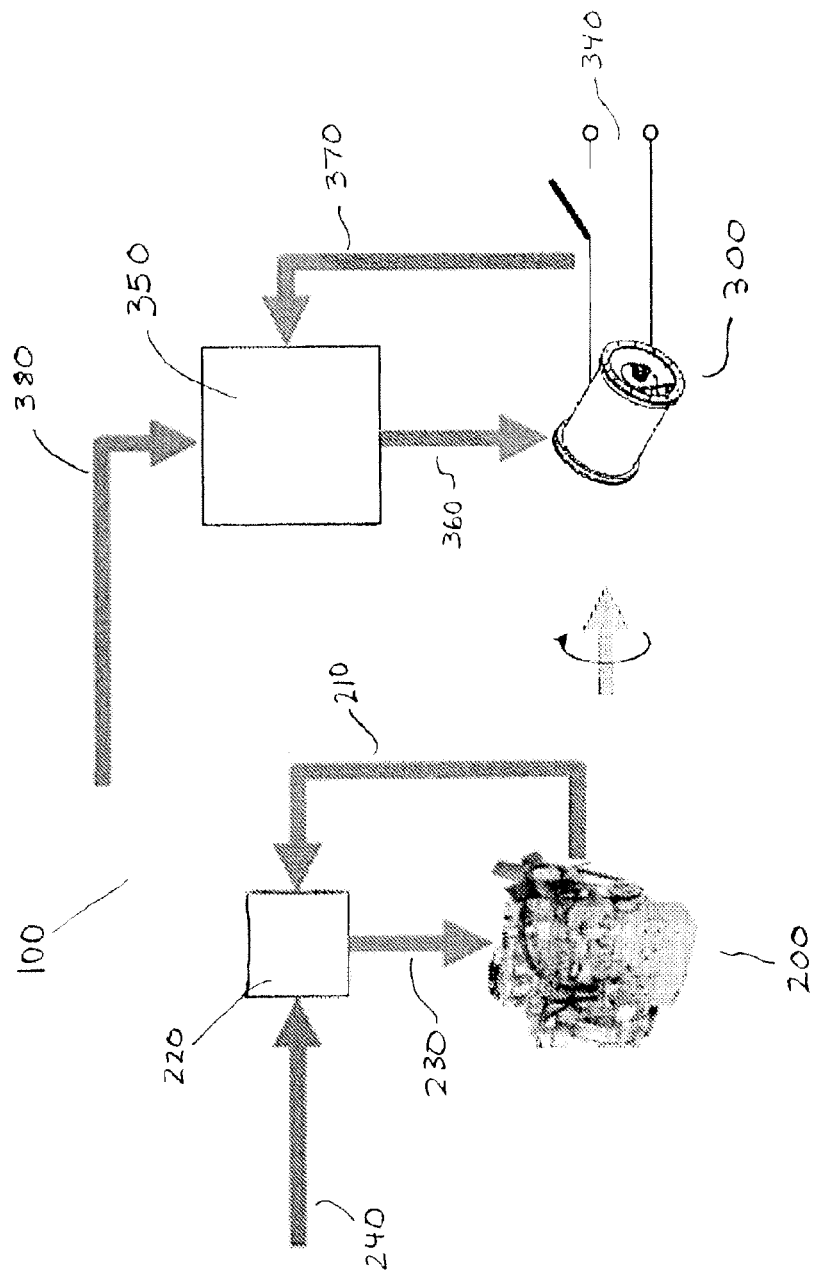
FIG. 1 is a schematic view of a fixed-speed generator set.

According to an exemplary embodiment, a variable speed engine generator includes an engine, an electrical generator, conditioning circuitry, a load sensor, and a system controller. The engine produces mechanical power. The electrical generator is mechanically connected to the engine and converts mechanical power into electrical power. The generator system includes conditioning circuitry that conditions the electrical power to supply an electrical load. The conditioning circuitry may include a rectifier and one or more capacitors. A load sensor may be arranged on a load side of the capacitor(s) and is configured to detect an electrical condition indicative of the load. The load sensor is also configured to communicate load information to the system controller. The system controller sends a control request signal to the engine based at least in part on the load information sensed by the load sensor.

According to an exemplary embodiment, an engine generator includes an engine, an electrical generator, and a system controller. The engine produces mechanical power and includes an engine controller and turbocharger. The engine controller controls the engine and the turbocharger. The electrical generator is mechanically connected to the engine and converts mechanical power into electrical power. The system controller receives signals with information regarding conditions of the engine, electrical generator, and a load. In response to certain transient conditions, the system controller sends a control request signal to the turbocharger based at least in part on the condition information.

According to an exemplary embodiment, an engine generator includes an engine, an electrical generator, conditioning circuitry, and a system controller. The engine produces mechanical power. The electrical generator is mechanically connected to the engine and converts mechanical power into electrical power. The generator system includes conditioning circuitry to condition the electrical power to supply an electrical load. The conditioning circuitry is also configured to limit output power. The system controller receives signals with information regarding conditions of the engine and the electrical load. During certain transient conditions, the system controller sends a control request signal to the conditioning circuitry to limit output power to the electrical load based at least in part on conditions of the engine and conditions of the electrical load (e.g., actual or anticipated load).

According to an exemplary embodiment, a method is provided for controlling a variable speed engine generator having an engine, electrical generator, and conditioning circuitry with a system controller. The method includes the step of receiving signals with information regarding conditions of a load and conditions of the engine, electrical generator, and conditioning circuitry. The method also includes the step of processing the condition information to determine a present load value based on conditions of the load and an instantaneous torque capability value based on conditions of the engine, electrical generator, and conditioning circuitry. A further step includes comparing the present load value with the instantaneous torque capability to determine if the expected load value is greater than the instantaneous torque capability. If the present load value is greater than the instantaneous torque capability, the system controller sends a control request signal to limit output power from the conditioning circuitry.

Figure 2:
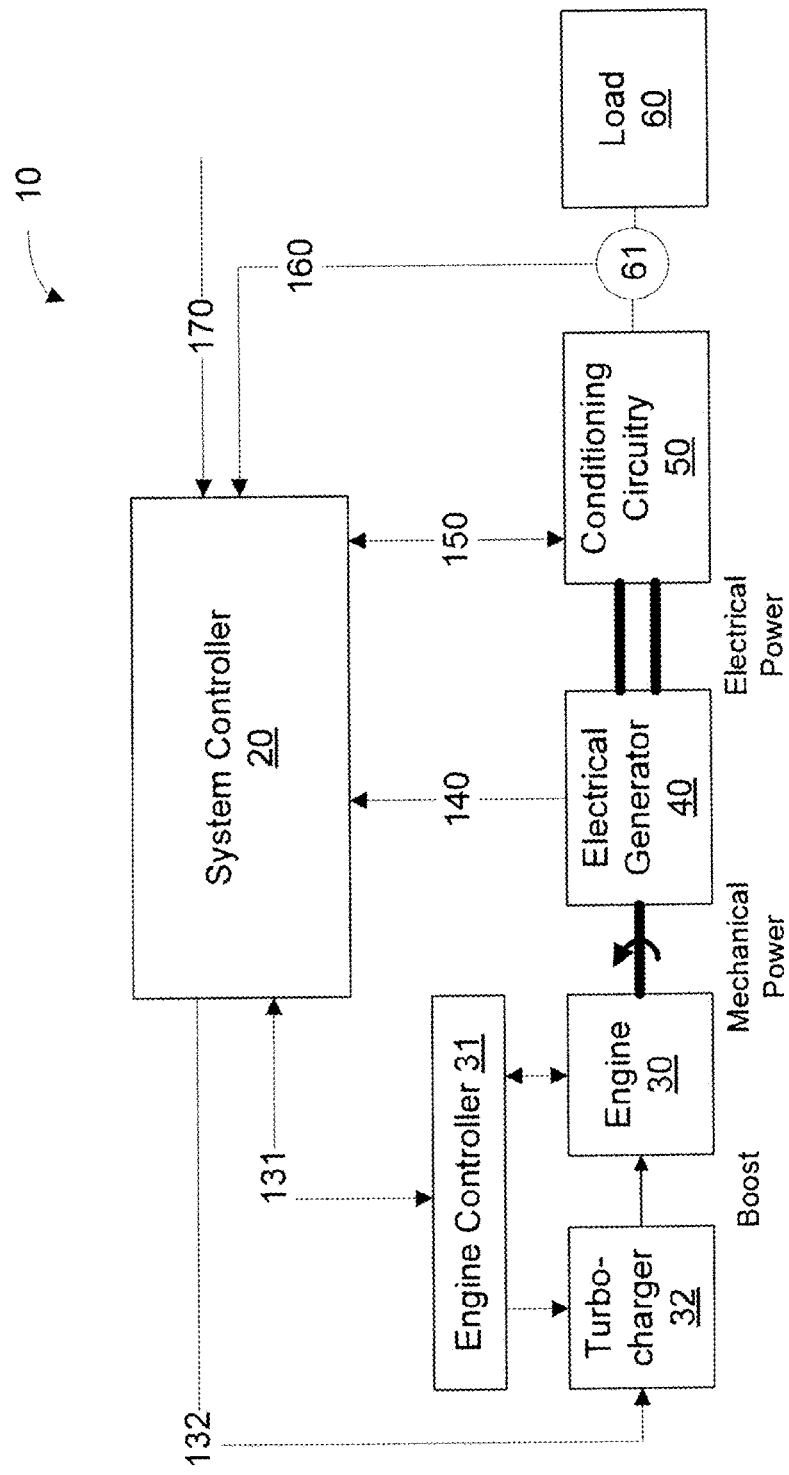
FIG. 2 is a schematic view of a variable-speed generator set according to an exemplary embodiment.
Figure 4:
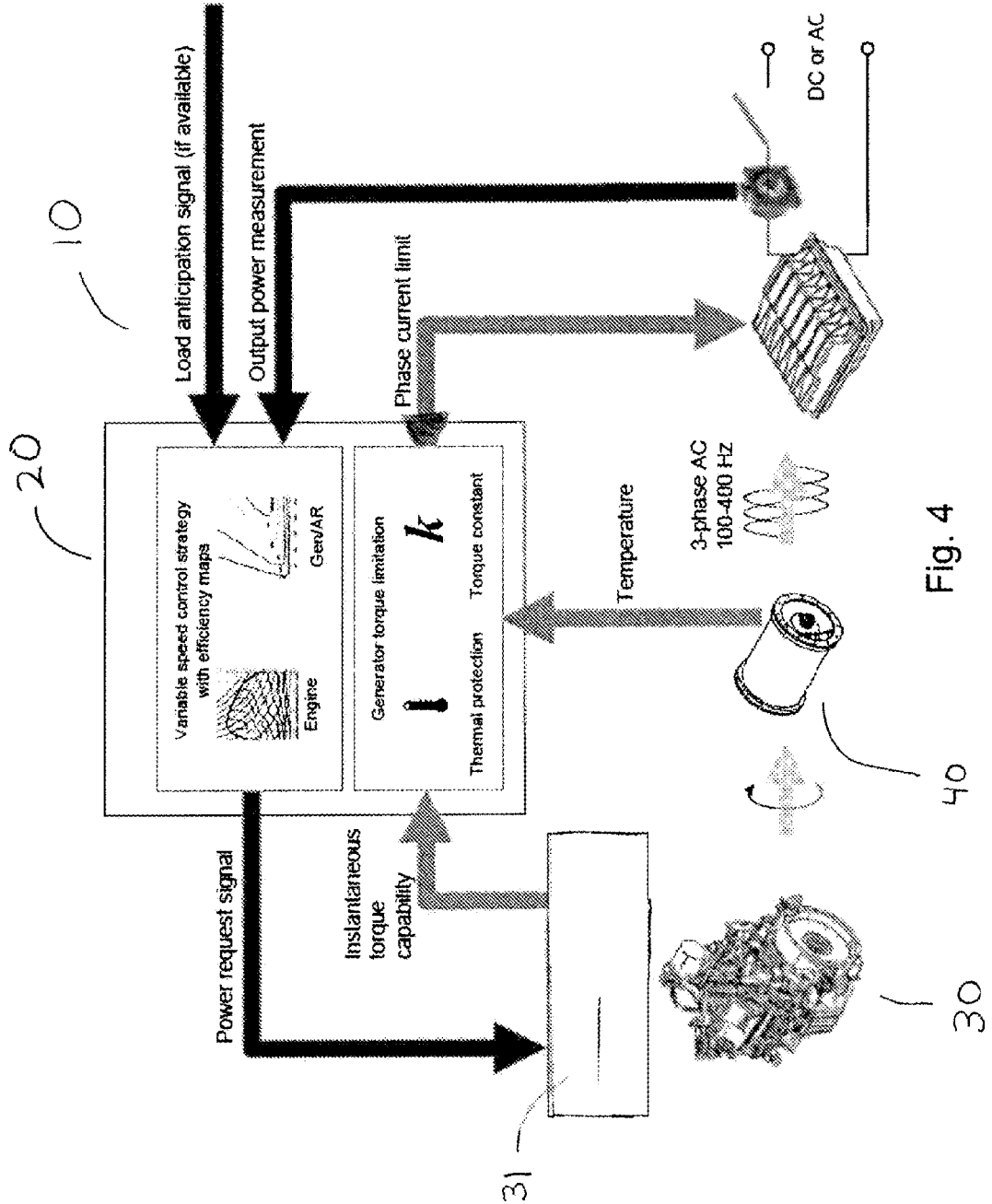
FIG. 4 is a schematic view of a variable-speed generator set according to an exemplary embodiment.
Figure 5:
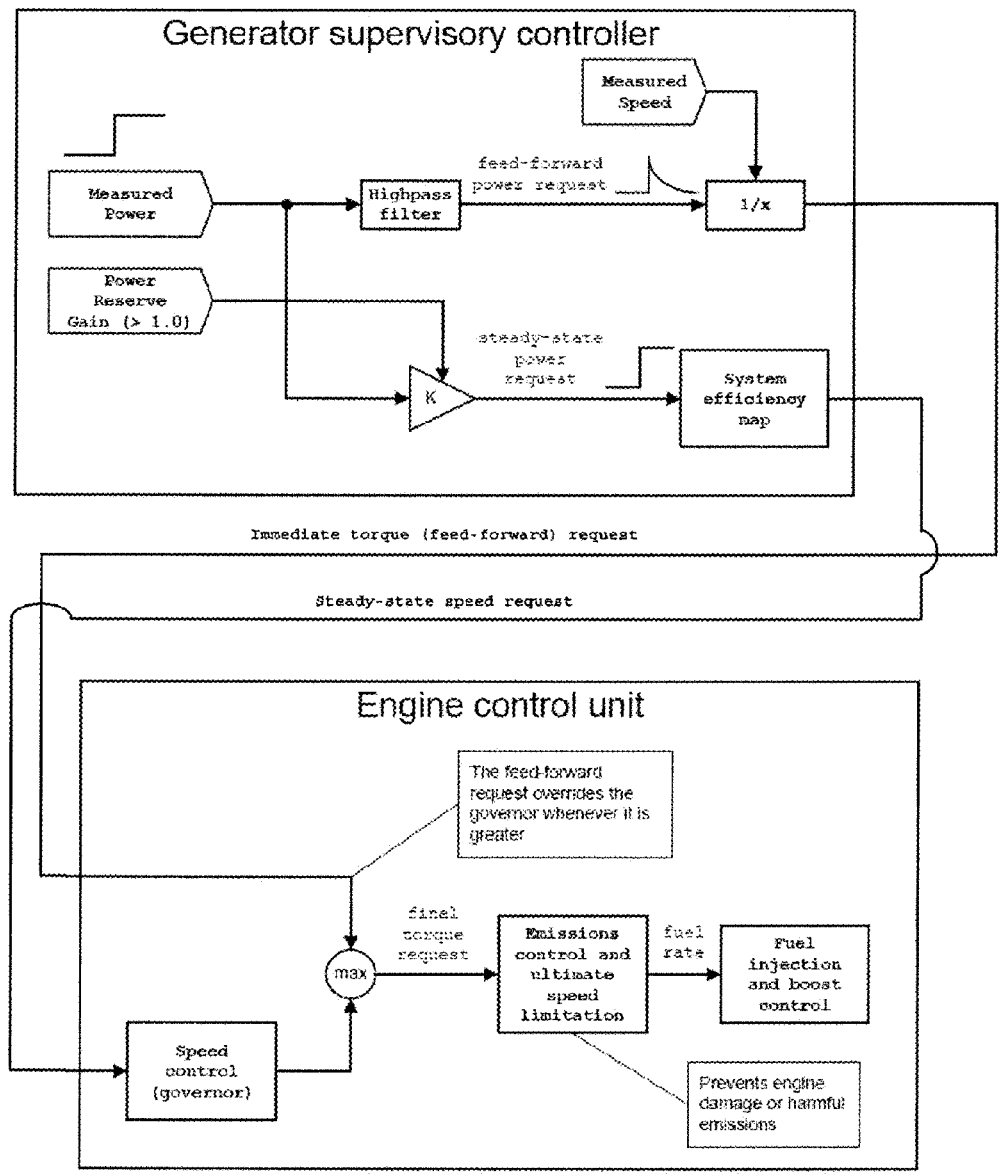
FIG. 5 is a schematic view of a system controller and an engine controller according to an exemplary embodiment.

Referring now to FIGS. 2 and 4-5, according to an exemplary embodiment, a variable speed engine generator 10 is provided that is configured to provide improved response to transient load conditions. The engine generator 10 generally includes an engine 30, an electrical generator 40, electrical output conditioning circuitry 50, and a system controller 20. The engine generator 10 is configured to power an electrical load 60. According to other exemplary embodiments, the engine generator 10 is a fixed speed engine generator.

According to an exemplary embodiment, the engine 30 is a direction injection diesel engine and includes a fuel delivery system, a turbocharger 32, and an engine controller 31. The fuel delivery system is configured to deliver fuel into cylinders of the engine according to fuel requests from the engine controller 31. The turbocharger 32 is configured to boost air pressure entering the engine cylinders (i.e., increasing pressure of intake air above atmospheric pressure). The turbocharger 32 includes a turbine spun by exhaust gases from the engine 30. The turbine is coupled by a shaft to a compressor, which spins at the same speed as the turbine. The compressor draws air from the atmosphere, compresses the air, and pumps the compressed air into the intake manifold of the engine 30 for delivery into cylinders of the engine 30. The increased air pressure provides for increased air mass in each of the cylinders, which in conjunction with increased fuel amounts, provides for more powerful explosions in the cylinders and, thus, more power output from the engine 30. In an alternative embodiment, the engine may be a rotary type engine. The engine 30 may be an engine wherein the fuel is ignited by spark ignition or another type of ignition (e.g., compressed ignition). The engine may utilize a different cycle such as, for example, Otto cycle, Atkinson cycle, etc.). The engine may utilize different fuels (e.g., gasoline, natural gas, etc.), and/or different fuel delivery methods (e.g., electronic fuel injection, direct fuel injection, carburetion, etc.).

The turbocharger 32 may be a variable geometry turbocharger. The variable geometry turbocharger 32 includes a turbine having vanes that may be configured into different orientations. For example, turbocharger geometry may be adjusted by synchronously changing the rotational position of the vanes relative to the flow of exhaust gas passing by the vanes or by sliding the vanes inward or outward from the turbine's axis of rotation. By moving the vanes into different orientations, the speed of the turbine, and therefore the speed of the compressor and boost pressure, may be adjusted relative to the amount of exhaust gas passing by the turbine. For example, vanes rotated to a more perpendicular orientation relative to the exhaust gas will cause the turbine, and therefore the compressor, to spin slower than if the vanes were more parallel to the flow of exhaust gas. Or the vanes may be positioned closer to the axis of rotation of the turbine to cause the turbine to spin faster than if the vanes were positioned further from the axis of rotation.

The engine controller 31 is configured to control various parameters of the engine 30, including the turbocharger 32 and delivery of fuel. The engine controller 31 may, for example, include a processor, memory, and data interface. The engine controller 31 is configured for receiving input signals through the data interface, processing signals according to software programming and information stored in the memory, sending signals via the data interface for controlling various engine components and sending signals via the data interface for communicating information to other components or controllers of the engine generator 10.

The engine controller 31 receives signals of various types from various sources, including the system controller 20 and various engine sensors. For example, the system controller 20 may send a power request signal to request a certain engine speed, torque, or fuel delivery that corresponds to a steady state load (i.e., a steady state power request) or that corresponds to transient load conditions (i.e., a feed-forward power request). As discussed in further detail below, the system controller 20 determines steady state speed request and a feed-forward and feed-forward power requests according steady state and feed-forward control strategies, respectively. The engine controller 31 may also receive signals that communicate information related to engine conditions that are measured by various sensors (e.g., engine speed, engine temperature, fuel temperature, intake pressure, etc.).

The engine controller 31 processes the power request signals and engine condition signals according to various programming including, for example, governor or speed control programming, final fuel request programming, and various fuel limiting control programming. More particularly, the engine controller 31 determines the proper delivery of fuel into cylinders of the engine 30 according to the various programming. The engine controller 31 then sends signals for actuating the fuel delivery system to inject fuel into cylinders. In conjunction with determining proper fuel delivery, the engine controller 31 may also determine proper boost requirements, and send signals for changing geometry of the turbocharger 32.

The speed control program (e.g., governor control program) is configured to hold the engine 30 at a specific output, such as a steady state speed requested by the system controller 20. More particularly, the speed control program determines, based on the measured speed of the engine 30, the amount of fuel required to maintain the requested steady state speed (i.e., a steady state fuel request). The engine controller 31 may then send corresponding signals to the fuel delivery system (e.g., a fuel injection system) to deliver the appropriate amount of fuel to maintain or resume the speed requested by the system controller 20. As such, the speed control program allows the engine 30 to maintain a steady speed capable of supplying sufficient mechanical energy to the electrical generator 40 to support the attached load. If for example, the engine speed falls below the specified speed, the speed control program requests that increased quantities of fuel be delivered into cylinders of the engine 30. If the engine speed rises above the requested speed, the speed control programming requests that decreased quantities of fuel be delivered.

The engine controller 31 also contains programming for delivering fuel according to a feed-forward control strategy. More particularly, the engine controller includes programming for comparing fuel delivery requirements for the steady state and feed-forward control strategies to determine a final fuel request. For example, the engine controller 31 may determine the final fuel request to be the greater of that required by the steady state control strategy (i.e., the steady state fuel request as determined by the speed control program) and that required by the feed-forward control strategy. Under conditions where fuel delivery required by the feed-forward control strategy is greater than that required by the steady-state control strategy, the system controller 20 effectively bypasses or overrides the speed control program.

Actual fuel delivery to the engine (e.g., the fuel rate) may be limited according to various controls programming, such as emissions, speed limitation, and fuel waste controls. According to the emissions control program, the engine controller 31 utilizes the final fuel request signal and engine conditions to determine whether, when, and how much fuel should be delivered to the cylinders to minimize or avoid creation and expulsion of harmful pollutants. The engine controller 31 then sends signals for controlling various engine systems or devices. The signals may, for example, call for adjusting, and potentially limiting, the amount of fuel delivered into the engine cylinders as compared to the final fuel request.

According to the speed limitation program, the engine controller 31 limits fuel delivery to limit engine speed and, therefore, prevent engine damage. The speed limitation program utilizes measured engine speed, other engine conditions, and characteristics peculiar to the specific engine design and/or application, so as to limit fuel delivery to restrict engine.

According to the fuel waste program, the engine controller 31 limits fuel delivery to prevent unnecessary fuel waste. The fuel waste program may, for example, utilize engine conditions and characteristics to restrict the quantity of fuel that would otherwise be delivered into engine cylinders under power request signals or other engine control programming. For example, while the final fuel request may call for a particular amount of fuel, the fuel waste program may reduce the amount of fuel delivered due to particularly inefficient combustion for a particular amount of fuel in a cylinder of certain physical characteristics and/or conditions (e.g., intake temperature, intake pressure, engine speed, etc.).

Further, actual fuel delivery may be limited as compared to the final fuel request according to physical limitations of the engine 30. For example, in circumstances where engine speed has fallen well below the steady state request or in greatly increased load situations, the steady state or the feed-forward control strategies, respectively, may call for significantly increased quantities of fuel. Components and other characteristics of the engine 30 may, however, provide physical limitations on the quantity of fuel that may be delivered into the cylinders, such as fuel injector or port size, amongst others. The physical limitations of the engine may be taken into account by the engine controller 31 and/or the system controller 20 under the various control strategies or programs described herein.

According to other exemplary embodiments, the various engine controls programming may be provided in different manners as may be deemed appropriate for a particular application including, for example, different combinations of programming (e.g., more or fewer programs, with or without the aforementioned programming, and/or including different types of programming), different arrangements of programming (e.g., operating the programming in different orders), providing the programming in different means (e.g., providing the engine controls-type programming within the system controller 20 and/or other controllers), converting different power request signals into fuel requests (e.g., torque request into fuel per stroke quantities, etc.), and the like.

The engine controller 31 may communicate present engine condition information to the system controller 20. The engine controller 31 may, for example, send signals for communicating engine conditions (e.g., engine temperature, speed, intake pressure, fuel temperature, turbocharger 32 geometry) to the system controller 20. The engine controller 31 may also derive other information from the engine conditions and communicate the other information to the system controller 20. In particular, the engine controller 31 may determine instantaneous torque capability of the engine 30 based on engine conditions (e.g., engine speed, engine temperature, intake temperature, intake pressure, exhaust gas recirculation (EGR) valve position, fuel temperature, fuel delivery, exhaust gas temperature, and/or exhaust gas sensors) and/or and other requirements (e.g., emissions, after-treatment, etc.) such as through a look up table and/or by performing a calculation. Instantaneous torque capability is the maximum amount of torque the engine 30 may produce at a given moment under then present engine conditions. According to other exemplary embodiments, instantaneous torque capability is determined by the system controller 20 based on engine condition information received by the system controller 20.

The engine 30 is mechanically coupled to the electrical generator 40 to transfer mechanical energy to the electrical generator 40. The engine 30 and electrical generator 40 may be coupled, for example, by a direct coupling such that the engine 30 and electrical generator 40 spin at the same speed. According to other exemplary embodiments, the engine 30 and electrical generator 40 may be coupled by a fixed gear coupling (i.e., such that the engine 30 and electrical generator 40 spin at fixed speed ratios in relation to each other), or by a transmission (i.e., such that the engine 30 and electrical generator 40 may spin at variable speed ratios in relation to each other).

The electrical generator 40 is a synchronous permanent magnet generator configured to convert mechanical power into electrical power. More particularly, the electrical generator 40 converts mechanical power from the engine 30 into 3-phase AC power of variable frequency and voltage. According to other exemplary embodiments, the electrical generator may be a different type (e.g., wound-field, induction, switched reluctance, brushless DC, etc.), output single or other phase AC energy, and/or output AC power at different frequencies (e.g., from more or less than 100 Hz to more or less than 400 Hz).

The electrical generator 40 is electrically connected to conditioning circuitry 50. AC power is transferred from the electrical generator 40 to the conditioning circuitry 50, which then conditions the AC power for use by attached electrically-powered devices and/or supply to an electric distribution system. The conditioning circuitry 50 generally includes a controller, active rectifier, and an inverter (if AC output is required). The conditioning circuitry 50 may be provided as a single device incorporating components and circuitry for performing the various functions of the conditioning circuitry 50, or may be provided as separate devices connected together to transfer electric power and/or send and receive signals.

The conditioning circuitry 50 includes a rectifier. The rectifier is configured for converting AC power of varying frequency and voltage (i.e., corresponding to variable engine speeds) into DC power. According to one exemplary embodiment, the rectifier is an active rectifier configured to output DC power at a desired voltage. The active rectifier also includes storage capacitors for smoothing DC power output in transient load conditions. According to another exemplary embodiment, the rectifier is a passive rectifier configured to output DC at varying voltages according to the AC power output from the electrical generator 40. A converter may follow the passive rectifier and is configured to adjust the voltage of DC power from the passive rectifier according to the required voltage of attached DC-powered devices (i.e., increase or decrease voltage through a converter or equivalent circuitry and components).

The conditioning circuitry 50 may also include an inverter where AC-power output is required. The inverter is configured to convert DC power output from the active rectifier, passive rectifier, or converter into AC power at a specific frequency and voltage according to the power requirements of attached AC-powered devices (i.e., DC power is converted into AC power through an inverter or equivalent circuitry and components).

The conditioning circuitry 50 may be configured to limit electrical power output in transient conditions. For example, the active rectifier may be configured to cause the output voltage to the load 60 to be limited, thereby also limiting the current drawn from the generator. By limiting power output to attached devices, counter torque from the electrical generator 40 to the engine 30 may be limited, such as to eliminate or reduce the amount of counter torque or delay generation of counter torque.

According to an exemplary embodiment, the system controller 20 is provided for controlling various components or systems of the engine generator 10, or a plurality of engine generators. More particularly, the system controller 20 includes programming to improve response to transient load conditions by shortening engine response time and/or limiting power output from the rectifier.

According to an exemplary embodiment, the system controller 20 includes a processor, local memory, and a data interface. The signals are sent and received by the system controller 20 via the data interface to and from various components and systems of the engine generator 10. The processor processes signals received according to programming and information stored in the local memory, and then sends signals for controlling or communicating information to the various components and systems of the electrical generator 40.

According to an exemplary embodiment, the system controller 20 receives signals that communicate condition information for the engine 30 (i.e., signals 131 received from the engine controller 31), electrical generator 40 (i.e., signals 140 received from the electrical generator 40), and conditioning circuitry 50 (i.e., signals 150 received from the conditioning circuitry 50), as well as signals that communicate load information. Engine conditions may include, for example, speed, temperature, intake pressure, fuel delivery conditions, and instantaneous torque capability. Generator information may include temperature, rotor position, phase current, field current, etc. Conditioning circuitry information may include output current, phase current of the rectifier, switching device temperature, etc.

Additional signals 160, 170 communicating load information may also be sent to and received by the system controller 20. Load information may include voltage and/or current measurements of the rectifier taken on the supply side of the capacitors. Load information may include voltage and/or current measurements from one or more sensors 61 disposed on the load side of the capacitors. As compared to the supply side voltage, load side current is an earlier indicator of present load, because the capacitors cause the rectifier voltage drop to lag behind increased current to attached loads. Load information may also include anticipatory information including, for example, indications from an attached device or controller for attached devices that one or more devices will soon demand more power from the engine generator 10. For example, an anticipatory load signal may be sent from a refrigerator to indicate that a compressor will be turned on in a certain amount of time and require a certain amount of electrical power. Anticipatory load information may also provide indications that no or limited additional electrical power will be required from attached devices.

The system controller 20 may also include stored information regarding particular characteristics of the engine 30, electrical generator 40, and/or conditioning circuitry 50. Fixed characteristics of the engine 30 may include, for example, a power map, efficiency map, torque curve, and other information related to performance of the engine 30 under various conditions, etc. Fixed characteristics of the generator 40 may include, for example, torque constant under various conditions, power loss under various conditions, etc. Fixed characteristics of the conditioning circuitry characteristics 50 may include, for example, power loss under various conditions such as input power voltage and frequency, output voltage and frequency, temperature, etc.

The system controller 20 may process signals received according to various programming and stored information, and send signals for controlling the various components and systems of the engine generator 10. More particularly, the controller includes programming for steady state, feed-forward, and load-limiting control strategies.

According to an exemplary embodiment, the steady state control strategy is configured to determine a steady state power request. As mentioned above, the system controller 20 may send a power request signal to request a certain engine speed, torque, or fuel delivery that corresponds to a steady state load (i.e., a steady state power request). More particularly, the steady state control strategy determines an optimized steady state speed that corresponds to a particular load. For example, system controller 20 may determine, for example with a lookup table and/or calculations, the optimum engine speed for fuel efficiency for a given power output. The optimum engine speed may, for example, be determined according to the power map of the engine, other known characteristics of the engine, and/or current conditions of the engine. The system controller 20 then sends a steady state power request signal to the engine controller 31 to request the steady state speed. The steady state power request signal may, for example, be a value stored by the engine controller 31 or a step function.

As discussed above, the engine controller 31 receives the steady state power request signal and determines a steady state fuel request that is used by the engine controller 31 to determine actual fuel delivery according to various programming (e.g., speed control, final fuel request, emissions, speed limiting, fuel waste, etc.). According to other exemplary embodiments, the steady state control strategy may incorporate other information (e.g., condition and/or fixed system information), other considerations (e.g., total system efficiency, system responsiveness, etc.). By utilizing fixed characteristic and present condition information for each of the systems and/or components of the engine generator, the system controller may better optimize operation of the engine generator (e.g., for total system efficiency, total system responsiveness, or some combination thereof).

According to an exemplary embodiment, the feed-forward control strategy is configured to improve responsiveness of the engine 30 to account for transient load conditions. Under the feed-forward control strategy, the system controller 20 utilizes early load indicators to determine whether additional power output is required from the engine 30. For example, the system controller 20 may determine expected electrical load based on present load information (i.e., load side current or voltage measurements) alone or in combination with anticipated load information. Based on the expected load and current engine conditions (e.g., speed, temperature, etc.), the system controller 20 determines necessary fuel delivery (i.e., fuel injection quantity per stroke to meet the required torque demand for the expected load) and sends a corresponding feed-forward power request signal 131 to the engine controller 31. By utilizing early indicators of expected load (i.e., load side current and anticipatory load information), the engine generator 10 may respond more quickly to meet transient load demands.

As discussed above, the engine controller 31 determines a final fuel request by taking the greater fuel requirement of the steady state control strategy (i.e., the fuel requirement as determined by engine controller 31 according to the speed control program) and the feed-forward control strategy (i.e., the fuel requirement specified by the system controller 20 according to transient load and engine conditions). Further, the final fuel request is then processed according to the emissions, speed limitation, and fuel waste control programs to determine actual fuel delivery by the fuel delivery system.

While the feed-forward control strategy utilizes indicators of actual load (e.g., load-side current measurements) and predictive indicators of anticipated load to improve responsiveness in transient loading conditions, these indicators and the feed forward power requests are inherently inaccurate as compared to the actual load. Thus, it is advantageous to revert to the steady state control strategy to determine fuel delivery after occurrence of transient conditions. More particularly, the feed-forward fuel request signal may be filtered, such as with a high-pass filter, to only be present during transient loading events. Each feed-forward fuel request may, for example, be an impulse input (e.g., appearing as a "spike") that gradually reduces or tapers off to zero, such that the steady state fuel request governs after the transient event and load is generally steady. Eventually after the transient condition, the engine controller 31 determines the steady state fuel requirements to be greater than the feed-forward fuel requirements, such that the steady state control strategy governs fuel delivery until another transient load condition occurs.

According to another exemplary embodiment, the feed-forward control strategy is instead, or additionally, configured to be responsive to reduced-load transient conditions, for example, when a load is turned off or detached from the engine generator 10. A reduced-load portion of the feed-forward control strategy is configured to reduce delivery of fuel to the engine, which might otherwise result in wasted fuel or over speeding the engine, depending on the engine type, to cause an electrical overfrequency fault or an engine overspeed fault. Under the reduced-load portion of the feed-forward control strategy, the system controller 20 utilizes leading load indicators and anticipatory load information to determine occurrence of a reduced-load condition and sends a corresponding signal to the engine controller 20. The reduced-load signal may, for example, be a binary indicator, a power request signal (e.g., required fuel quantity or torque value), or other indicator sufficient to communicate to the engine controller 31 that smaller amounts of fuel should be delivered to the engine 30. Up receipt of the reduced-load signal, the engine controller 31 may, for example, temporarily cutoff fuel supply and/or determine the final fuel request to be the lesser of the steady state power request and feed-forward power request (i.e., as opposed to the greater fuel request under increased load situations). According to other exemplary embodiments, the reduced-load portion of the feed-forward strategy may be implemented in other manners.

According to an exemplary embodiment, under the feed-forward control strategy, the system controller 20 may also directly request increased boost pressure from the turbocharger 32 via a turbocharger control request signal 132. Normally, the turbocharger 32 is controlled by the engine controller 31 with boost pressure being increased after fuel is injected into engine cylinders; however, the fuel limiting programs (e.g., emissions, speed limiting, and fuel waste control programs) may limit fuel injection until boost pressure is built up, therefore delaying responsiveness of the engine 30 due to the need to first build boost pressure. By bypassing the engine controller 31, the system controller 20 may build boost pressure sooner by requesting the turbocharger 32 increase boost pressure (i.e., by changing its geometry) before fuel is injected. Accordingly, the engine generator 10 may respond more quickly to meet transient load demands.

Employing a feed-forward control strategy, the system controller 20 may determine proper engine and turbocharger requests in any manner sufficient for the engine generator 10 to respond in the manners described above. For example, the system controller 20 may perform more or fewer calculations and/or derive engine and turbocharger requests directly from expected load information as opposed to determining intermediate expected load and required torque values.

The load-limit control strategy is configured to prevent the engine 30 from stalling. Under the load-limit control strategy, the processor utilizes early load indicators to determine whether the engine 30 can meet the torque demands of an expected load. The system controller 20 determines an expected load value based on the present electrical load (i.e., determined from load side current or voltage measurement) and anticipated loads. The expected load value is then compared to the instantaneous torque capability of the engine 30. If the expected load value requires more engine torque than the instantaneous torque capability of the engine 30, the electrical power output is limited so as to require less engine torque than the instantaneous torque capability. More particularly, the system controller 20 requests that the conditioning circuitry 50, specifically the active rectifier, limit output power to the loads (e.g., by limiting output voltage or frequency). By reducing electrical power output (i.e., limiting the electrical load drawn from the electrical generator 40), counter torque to the engine 30 may be reduced to so as to prevent the engine 30 from stalling.

The load-limit control strategy and feed-forward control strategy are used in conjunction with each other. For example, while the system controller 20 requests that the conditioning circuitry 50 limit electrical load to the generator 40, the system controller 20 may simultaneously request increased power output from the engine 30 and increased boost from the turbocharger 32. Particularly, the system controller 20 may request increased engine power output so as to exceed the torque required for the expected electrical load. When the instantaneous torque capability reaches or exceeds the required torque for the limited load or the expected load, the system controller 20 requests that the conditioning circuitry 50 no longer limit electrical power output.

The feed-forward strategy may be configured for more responsiveness to transient load conditions at the expense of fuel efficiency and vice versa. For different actual load conditions, the system controller 20 may request that the engine 30 operate to provide instantaneous torque capability in excess of the torque required for the actual load conditions. The excess instantaneous torque capability (i.e., reserve torque capacity) may be defined as some constant percentage (e.g., 25% of required torque, such that the instantaneous torque capability is 1.25 times the actual torque required), a fixed threshold (i.e., 25 ft-lbs), or percentages or thresholds that vary according to a given load. Further, the excess instantaneous torque capability may provide a minimum value and maximum value, so as to define a steady state operating range where the system controller 20 does not change feed-forward power requests. The excess instantaneous torque capability may be fixed, may be specified by an outside source such as a user or controller for another system, and/or may change based on load conditions. For example, if the anticipatory load signal 170 indicates that the expected load will not increase, the excess torque capability may be lessened. By providing excess instantaneous torque capability, the engine 30 burns fuel at an increased rate as compared providing no excess capability (i.e., the instantaneous torque capability meets that required for the present electrical load). However, excess instantaneous torque capability allows the engine generator 10 to be more responsive to transient load conditions and reduces the need for the conditioning circuitry 50 to limit output voltage.

Anticipated load information and/or excess instantaneous torque capability (i.e., reserve capacity) may be also be determined according to load prediction algorithms. For example, reserve capacity may be increased in response to recent load fluctuations or may be decreased recent steady load conditions. Reserve capacity may also be adjusted according to known load behaviors of particular devices. For example, where a small, known load increase is typically followed by a large, known load increase (e.g., a refrigerator fan followed by a compressor), the system controller 20 may define higher reserve capacity and, therefore, send an adjusted power request signal to the engine controller 30. The system controller 20 may also include a learning algorithm, whereby the system controller 20 recognizes repeat load patterns, for example, based on time of day, time of year, recent load conditions, sequential loading conditions, etc.

The generator set 10 may also be configured to employ a regenerative breaking-type function. In reduced load situations, the conditioning circuitry 50 and, in particular, the rectifier acts as a motor controller for the electrical generator 40. The electrical generator 40 is operated as a flywheel energy storage system, which stores excess rotational energy that may be later used for improved transient response.

Figure 3:
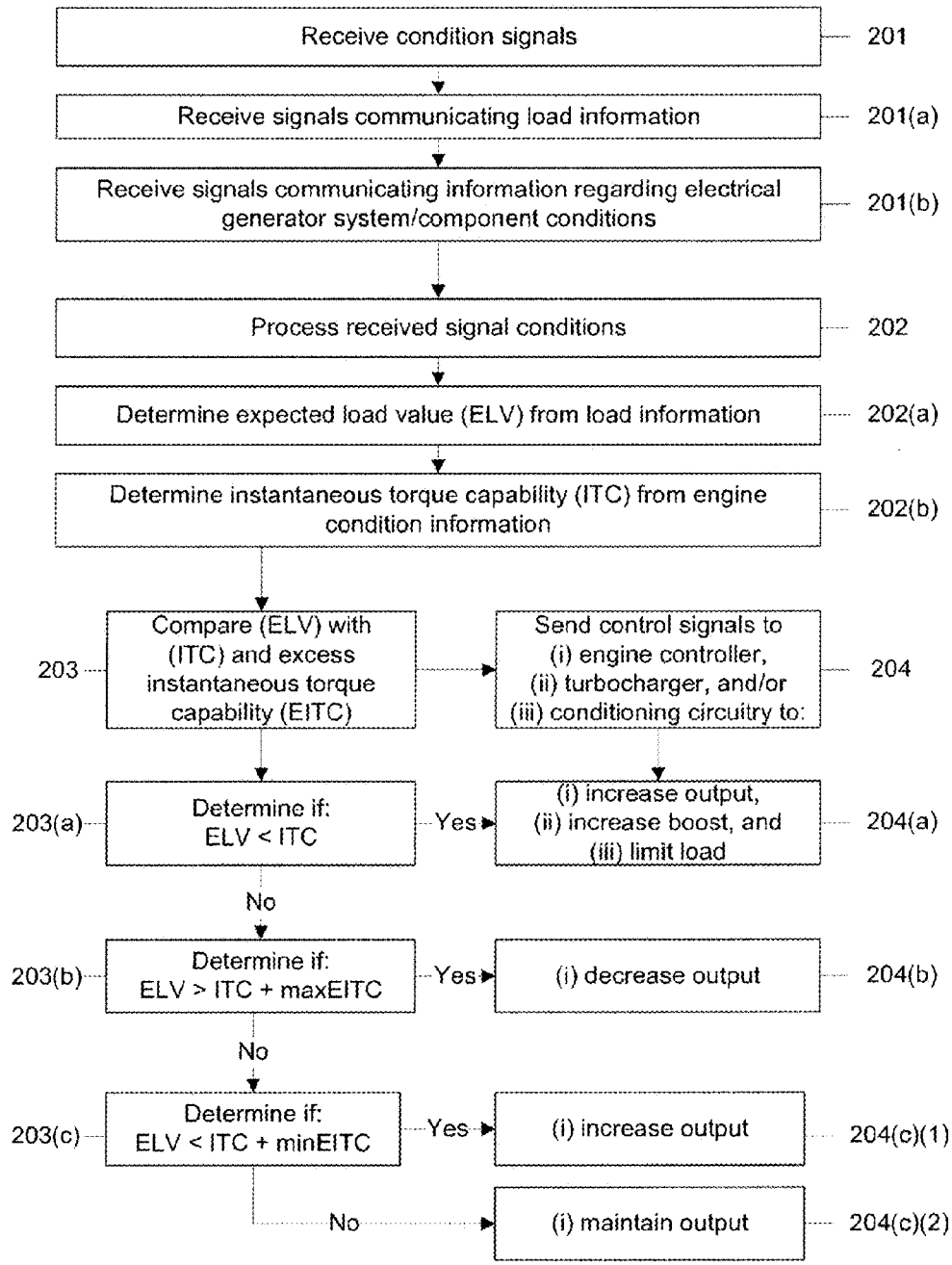
FIG. 3 is a flow chart for a method of controlling a variable-speed generator set according to an exemplary embodiment.

Referring now to FIG. 3, according to an exemplary embodiment, a method is provided for controlling an engine generator 410 with a system controller 20. The method generally includes: receiving load and system information (Step 201); processing load and system information (Step 202); comparing an expected load value to an instantaneous torque capability value (Step 203); and, sending control request signals to an engine controller 31, turbocharger 32, and conditioning circuitry 50 (Step 204).

One step in the method may include receiving load and system information (Steps 201(*a*) and 201(*b*)). Load information includes a current measurement received from a current sensor and/or a voltage measurement received from a voltage sensor on the load side of rectifier capacitors, and anticipatory load information about expected loads from a system or device controller. System information includes various information regarding the present conditions of the engine 30 (e.g., engine temperature, fuel temperature, intake pressure, engine speed, instantaneous torque capability), conditions of the generator (e.g., temperature, present torque constant, etc.), and the conditioning circuitry 50 (e.g., rectifier voltage, capacitor voltage, etc.).

Another method step may include processing load and system information. Processing load information includes determining a required torque value corresponding to the engine torque required to meet the current load (i.e. as indicated by the load side current measurement) and loads soon to be attached (Step 202(*a*)). The required torque value may be calculated directly based on the present and anticipated loads, or an intermediate expected load value may be calculated. Processing system information may include determining the instantaneous torque capability based on various engine conditions (e.g., engine temperature, fuel temperature, intake pressure, engine speed, etc.), such as by performing one or more calculations and/or referring to a look-up table (Step 202(*b*)). Or, the instantaneous torque capability may be provided to the system controller 20.

The required torque value may be compared with the instantaneous torque capability. Comparing may include determining:

(A) whether the instantaneous torque value is less than the required torque value (Step 203(*a*));

(B) whether the instantaneous torque value is more than the required torque value plus a maximum excess torque capability value (Step 203(*b*)); and, (C) whether the instantaneous torque value is less than a steady state range of the required torque value plus a minimum excess torque capability value (Step 203(*c*)).

The control request signal may be sent to the engine controller 31, turbocharger 32, and/or the conditioning circuitry 50. If (A) is determined true, the system controller 20: (i) sends a request signal to the conditioning circuit 50 to limit rectifier voltage; (ii) sends a request signal to the engine controller 31 to increase engine power output; and, (iii) sends a request signal to the turbocharger 32 to increase boost pressure (Step 204(*a*)). If (B) is true, the system controller 20 (i) sends a request signal to the engine controller 31 to reduce power output (Step 204(*b*)). If (B) is false and (C) is true, the system controller 20 (i) sends a request signal to the engine controller 31 to increase engine power output (Step 204(*c*) (1)). If (B) and (C) are false, the system controller 20 (i) sends a request signal to the engine controller 31 to maintain engine power output (Step 204(*c*)(2)).

It is important to note that the construction and arrangement of the engine and generator system as disclosed herein in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments

What is claimed is:

1. An electric power generation system comprising:
an engine, an electrical generator, and a system controller;
wherein the engine is configured to produce mechanical power and includes an engine controller and a turbocharger for raising air pressure to a boost pressure,
wherein the turbocharger is controlled by the engine controller during steady state operation of the system;
wherein the electrical generator is mechanically connected to the engine and converts mechanical power into electrical power;
wherein the system controller is configured to receive a signal indicative of an electrical load on the generator;
wherein, during a transient condition during which the electrical load increases, the system controller is configured to directly control the turbocharger in order to change the configuration of the turbocharger in order to increase boost pressure.

2. The system of claim 1, further comprising a sensor for detecting a current being drawn by the electrical load.

3. The system of claim 2, wherein the sensor is located downstream of circuitry for conditioning the generated electrical power.

4. The system of claim 1, wherein the signal received by the controller is indicative of an anticipated electrical load to be supplied by the generator.

5. An electric power generation system comprising:
an engine, an electrical generator, and a system controller;
wherein the engine is configured to produce mechanical power;
wherein the electrical generator is mechanically connected to the engine and converts mechanical power into electrical power;

wherein the system includes conditioning circuitry for conditioning the venerated electrical power;

wherein the system controller is configured to determine an expected electrical load on the generator based on a current electrical load and an anticipated electrical load;

wherein the system controller receives a signal indicative of a instantaneous torque capability of the engine;

wherein the system controller is configured to determine a required engine torque needed to generate sufficient electrical power to supply the expected load value; and wherein, if the required engine torque is greater than the instantaneous torque capability, the system controller controls the conditioning circuitry to limit the power generated by the generator.

6. The system of claim 5, wherein the conditioning circuitry includes an active rectifier.

7. An electric power generation system comprising:

an engine, an electrical generator, and a system controller;

wherein the engine is configured to produce mechanical power and includes an engine controller for controlling fuel to the engine;

wherein the electrical generator is mechanically connected to the engine and converts mechanical power into electrical power;

wherein the system controller is configured to receive a signal indicative of an electrical load on the generator;

wherein, according to a transient control strategy, the system controller is configured to determine an expected electrical load and based on the expected load and existing engine conditions the system controller provides a signal to the engine controller to deliver fuel to the engine sufficient to produce the required torque and power for the expected load;

wherein, according to a steady state control strategy, the system controller directs the engine controller to control the fuel to the engine to maintain a requested steady state speed; and wherein, if the fuel requirement determined by the steady state control strategy is greater than the fuel requirement determined by the transient control strategy, the engine controller is configured to control the fuel to the engine based on the signal provided by the system controller according to the steady state control strategy.

8. The system of claim 7, wherein, if the fuel requirement determined by the steady state control strategy is less than the fuel requirement determined by the transient control strategy, the engine controller is configured to control the fuel to the engine based on the signal provided by system controller according to the transient control strategy.

9. The system of claim 7, Wherein the system controller is configured to determine the expected load based on a signal provided to the system controller by the electrical load, wherein the signal is indicative of an anticipated change in the power to be demanded by the electrical load.

* * * * *